(12) United States Patent
Avraham et al.

(10) Patent No.: US 11,640,267 B2
(45) Date of Patent: May 2, 2023

(54) METHOD AND SYSTEM FOR MAINTENANCE ALLOCATION BETWEEN NVM GROUPS

(71) Applicant: Western Digital Technologies, Inc., San Jose, CA (US)

(72) Inventors: Dudy David Avraham, Even Yehuda (IL); Ran Zamir, Ramat Gan (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/470,141

(22) Filed: Sep. 9, 2021

(65) Prior Publication Data

US 2023/0071705 A1 Mar. 9, 2023

(51) Int. Cl.
G06F 3/06 (2006.01)

(52) U.S. Cl.
CPC .......... *G06F 3/0659* (2013.01); *G06F 3/0616* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| 8,949,555 | B1 | 2/2015 | Karamcheti et al. |
|---|---|---|---|
| 10,089,175 | B2 | 10/2018 | Fu et al. |
| 10,180,874 | B2 | 1/2019 | Bazarsky et al. |
| 10,691,531 | B2 | 6/2020 | Singhai et al. |
| 10,732,895 | B2 | 8/2020 | Earhart et al. |
| 10,747,613 | B2 | 8/2020 | Hanham et al. |
| 10,866,740 | B2 | 12/2020 | Benisty et al. |
| 2012/0278530 | A1* | 11/2012 | Ebsen ................ G06F 13/1684 711/E12.008 |
| 2018/0275923 | A1* | 9/2018 | Earhart ............... H04L 41/5019 |
| 2019/0073302 | A1 | 3/2019 | Allison et al. |
| 2020/0089537 | A1 | 3/2020 | Bahirat et al. |
| 2020/0409559 | A1 | 12/2020 | Sharon et al. |
| 2021/0089234 | A1 | 3/2021 | Yasui et al. |

OTHER PUBLICATIONS

NVM Express, Base Specification, Revision 1.4, Jun. 10, 2019, 403 pp.

* cited by examiner

*Primary Examiner* — Kevin Verbrugge
(74) *Attorney, Agent, or Firm* — Patterson + Sheridan, LLP; Steven H. VerSteeg

(57) ABSTRACT

A data storage device includes a memory device including a plurality of endurance groups and a controller coupled to the memory device. The controller is configured to allocate tokens to the plurality of endurance groups, determine whether endurance group has sufficient tokens to perform an operation, and either deny the operation or approve the operation. The operation is selected from the group consisting of: garbage collection, relocation of data, and read scrubbing. Each operation has the same or different cost as another operation. The controller is further configured to set thresholds for each endurance group of the plurality of endurance groups and adjust a threshold for one or more endurance groups of the plurality of endurance groups. The controller is further configured to determine whether the operation will breach quality of service for other endurance groups.

19 Claims, 7 Drawing Sheets

METHOD AND SYSTEM FOR MAINTENANCE ALLOCATION BETWEEN NVM GROUPS

BACKGROUND OF THE DISCLOSURE

Field of the Disclosure

Embodiments of the present disclosure generally relate to data storage devices, such as solid state drives (SSDs), and, more specifically, sharing of data storage device resources and maintaining fairness in latency and quality of service (QoS).

Description of the Related Art

In many consumer products, a host device does not directly manage dies of a non-volatile memory of a data storage device. Rather, the host device may delegate the responsibility to a controller of the data storage device and, in return, receive the full package of the data storage device (e.g., flash translation layer (FTL) information, error correction code (ECC), wear leveling, etc.). Furthermore, the data storage device has become more transparent to the host device, where the host device may be able to control and adjust the storage behavior to its needs. Host devices are given more control over data storage devices through the implementation of newer specifications and protocols relating to non-volatile memory express (NVMe). The ability to control the service that each user or application (e.g., NVM set and endurance group) receives in order to ensure fairness and meet data storage device requirements per group is essential.

A data storage device may be designed to map specific dies or channels to different non-volatile memory (NVM) sets or endurance groups. The mapping may effectively split the data storage device into multiple relatively independent drives. Thus, the splitting allows for wear leveling to be spread out between the multiple relatively independent drives as well as rigidly partitioning performance. However, because components of the data storage device may be shared between the multiple relatively independent drives, requests for resources, such as decoders, may cause the data storage device to experience higher latency and produce a lower quality of service (QoS).

Thus, there is a need in the art for an improved sharing mechanism for resources of a data storage device between multiple NVM sets or endurance groups.

SUMMARY OF THE DISCLOSURE

The present disclosure generally relates to data storage devices, such as solid state drives (SSDs), and, more specifically, sharing of data storage device resources and maintaining fairness in latency and quality of service (QoS). A data storage device includes a memory device including a plurality of endurance groups and a controller coupled to the memory device. The controller is configured to allocate tokens to the plurality of endurance groups, determine whether endurance group has sufficient tokens to perform an operation, and either deny the operation or approve the operation. The operation is selected from the group consisting of: garbage collection, relocation of data, and read scrubbing. Each operation has the same or different cost as another operation. The controller is further configured to set thresholds for each endurance group of the plurality of endurance groups and adjust a threshold for one or more endurance groups of the plurality of endurance groups. The controller is further configured to determine whether the operation will breach quality of service for other endurance groups.

In one embodiment, a data storage device includes a memory device including a plurality of endurance groups and a controller coupled to the memory device. The controller is configured to allocate tokens to the plurality of endurance groups, determine whether an endurance group has sufficient tokens to perform an operation, wherein the operation is selected from the group consisting of: garbage collection, relocation of data, and read scrubbing, and either deny the operation or approve the operation.

In another embodiment, a data storage device includes a memory device including a plurality of endurance groups and a controller coupled to the memory device. The controller is configured to set thresholds for each endurance group of the plurality of endurance groups and adjust a threshold for one or more endurance groups of the plurality of endurance groups.

In another embodiment, a data storage device includes a memory means having a plurality of endurance groups and a controller coupled to the memory means. The controller is configured to determine that an endurance group has sufficient tokens to perform an operation of a plurality of operations, determine whether the operation will breach quality of service for other endurance groups, and either approve or deny the operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, sharing of data storage device resources and maintaining fairness in latency and quality of service (QoS). A data storage device includes a memory device including a plurality of endurance groups and a controller coupled to the memory device. The controller is configured to allocate tokens to the plurality of endurance groups, determine whether endurance group has sufficient tokens to perform an operation, and either deny the operation or approve the operation. The operation is selected from the group consisting of: garbage collection, relocation of data, and read scrubbing. Each operation has the same or different cost as another operation. The controller is further configured to set thresholds for each endurance group of the plurality of endurance groups and adjust a threshold for one or more endurance groups of the plurality of endurance groups. The controller is further configured to determine whether the operation will breach quality of service for other endurance groups.

Figure 1:
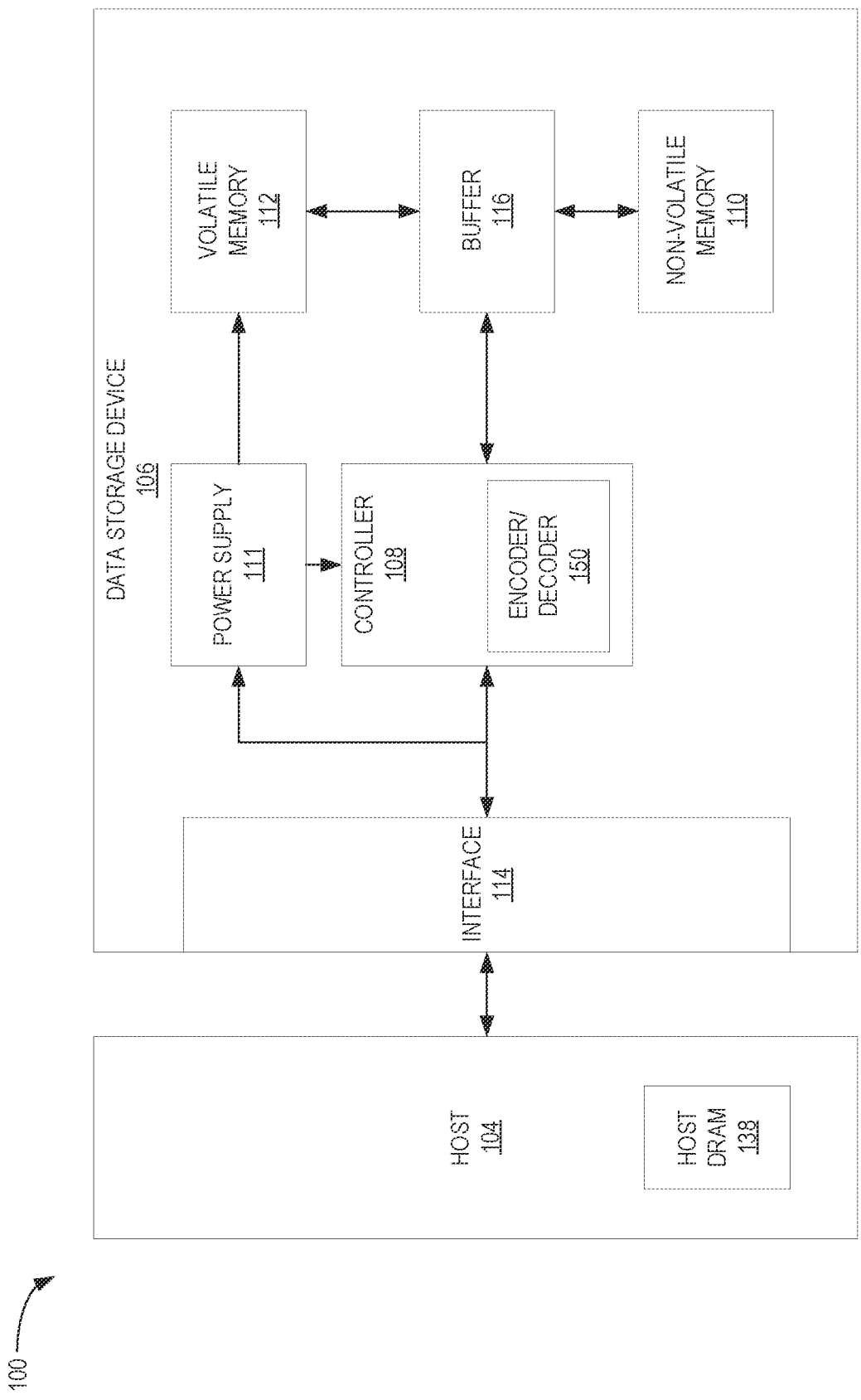
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes an encoder/decoder unit 150, which may be separate units. For example, the encoder/decoder unit 150 may be an encoder unit and a decoder unit. The encoder unit of the encoder/decoder unit 150 is configured to encode data received from the host device 104 to be stored in the NVM 110 or re-encode decoded data retrieved from the NVM 110 to be re-programmed to the NVM 110. Likewise, the decoder unit of the encoder/decoder unit 150 is configured to decode data retrieved from the NVM 110, such that the controller 108 may determine a number of bit errors of the data and whether error correction mechanisms or schemes need to be applied to the data. Encoding and decoding the data may increase data reliability.

Figure 2:
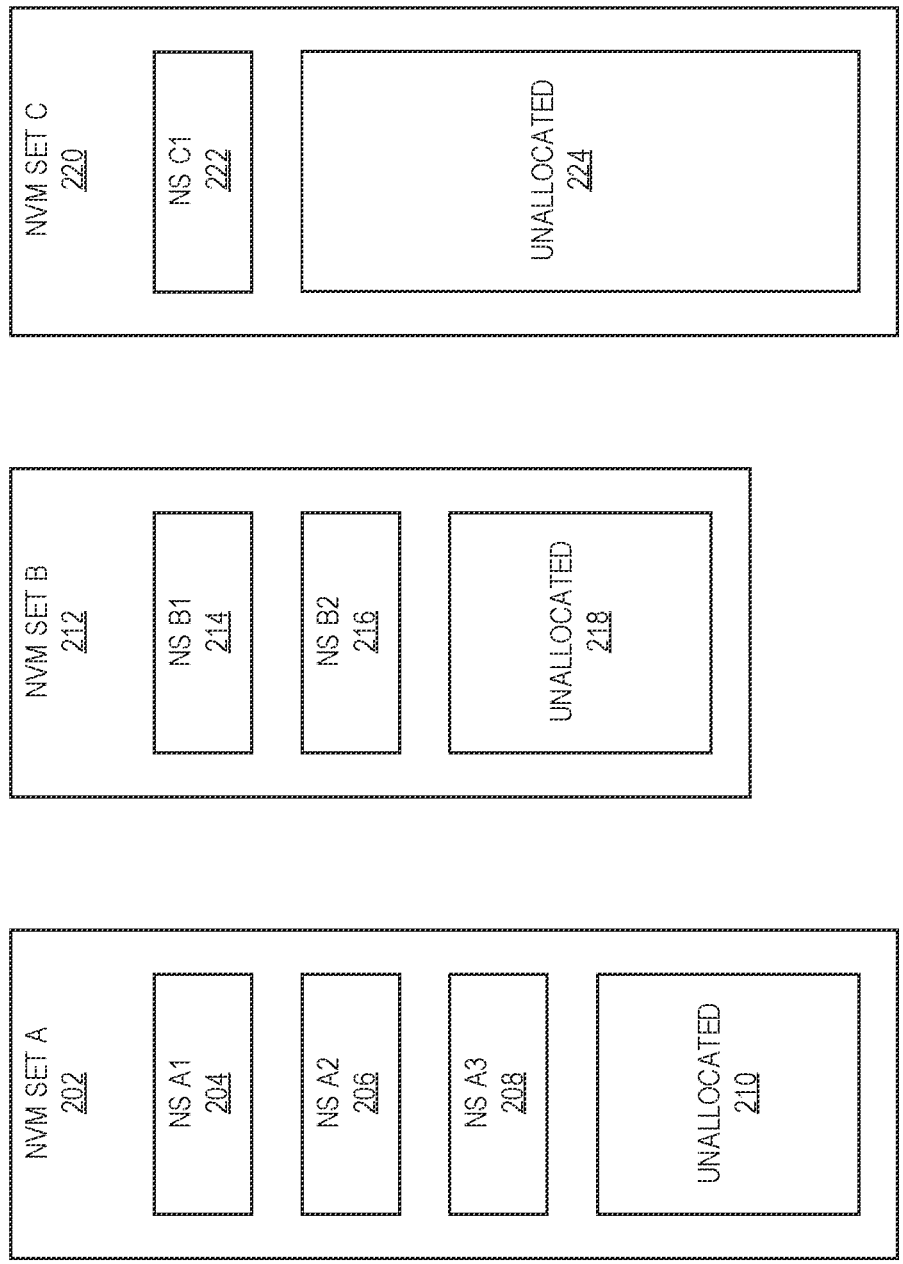
FIG. 2 is an illustration of NVM sets and associated example namespaces, according to certain embodiments.

FIG. 2 is an illustration of NVM sets and associated example namespaces, according to certain embodiments. An NVM that includes the one or more NVM sets 202, 212, 220 may be the NVM 110 of FIG. 1. Each NVM set includes one or more namespaces (NS) and an unallocated region that includes available NVM storage space not yet allocated to a namespace in the NVM set. In one embodiment, each NVM set includes the same number of namespaces. For example, a first NVM set A 202, a second NVM set B 212, and a third NVM set C 220 each includes one namespace. It is understood that the indicators "first," "second," and "third" in this context are relative and not absolute; that is, a "first" NVM set need not be the first on a die, or the first selected in a process. In another embodiment, each NVM set includes a different number of namespaces, where one or more NVM sets may have the same number of namespaces as one or more NVM sets.

In another example, a first NVM set A 202 includes three namespaces, a first NS A1 204, a second NS A2 206, and a third NS A3 208. The second NVM set B 212 includes two namespaces, a first NS B1 214 and a second NS B2 216. The third NVM set C 220 includes one namespace, a first NS C1 222. Disclosed namespaces of an NVM may be the same size in some embodiments, while in other embodiments such namespaces may be of different sizes. Moreover, a namespace may be logically allocated across multiple NVM's or on a single NVM.

Each namespace includes one or more memory locations in the NVM, where each memory location in the NVM is unique to a namespace. Furthermore, data stored in each namespace and each unallocated region of the NVM sets may be logically organized in a logical-to-physical (L2P) table. The L2P table includes pointers that point to the logical block address (LBA) of the relevant data stored in each memory location of the one or more NVM sets.

In one embodiment, each namespace of the one or more NVM sets may have the same amount of NVM storage space. For example, the first NS A1 204 and the second NS A2 206 of the first NVM set A 202 may each have the same storage space in the NVM, such as about 128 MB. In another embodiment, each namespace of the one or more NVM sets may have a different amount of NVM storage space, where one or more namespaces may have the same amount of NVM storage as one or more namespaces. In another example, the first NS A1 204 of the first NVM set A 202 may include about 128 MB of storage, and the second NS A2 206 of the first NVM set A 202 may include about 256 MB of storage. The listed values for storage capacity are not intended to be limiting, but to provide examples of possible embodiments.

In one embodiment, each unallocated region of the one or more NVM sets may have the same amount of NVM storage space. For example, an unallocated region 210 of the first NVM set A 202 and an unallocated region 218 of the second NVM set B 212 may each have the same storage space in the NVM, such as about 512 MB. In another embodiment, each unallocated region of the one or more NVM sets may have a different amount of NVM storage space, where one or more unallocated regions may have the same amount of NVM storage as one or more unallocated regions. In another example, the unallocated region 210 of the first NVM set A 202 may include about 1024 MB of storage and the unallocated region 218 of the second NVM set B 212 may include about 512 MB of storage. The listed values for storage capacity are not intended to be limiting, but to provide examples of possible embodiments.

Figure 3:
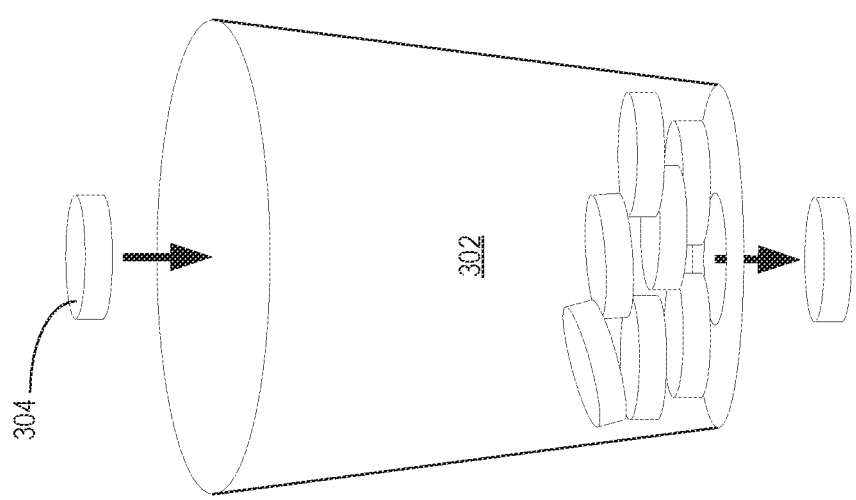
FIG. 3 is an illustration of a token bucket, according to certain embodiments.

FIG. 3 is an illustration of a token bucket 302, according to certain embodiments. The token bucket 302 may be a token bucket associated with any of the one or more NVM sets 202, 212, 220 or with each of the one or more NVM sets 202, 212, 220 of FIG. 2. The token bucket 302 includes one or more tokens 304. During initiation of a data storage device, such as the data storage device 106 of FIG. 1, or throughout operation of the data storage device 106, a controller, such as the controller 108 of FIG. 1, may allocate a number of the one or more tokens 304 to each of the one or more NVM sets 202, 212, 220. It is contemplated that the number of tokens allocated may be different between each NVM set. Furthermore, it is contemplated that less than all NVM sets may be allocated a number of the one or more tokens 304.

In one embodiment, the total number of the one or more tokens 304 is a finite number, such that the controller 108 may only allocate up to the total number of the one or more tokens 304. For example, the total number of the one or more tokens 304 may be based on statistics of the data storage device 106 and may be adjusted during the lifetime of the data storage device 106. In another embodiment, the total number of the one or more tokens 304 may be dependent on performance or quality of service (QoS) requirements. Furthermore, each token bucket 302 may have a maximum capacity of tokens, where the maximum capacity of tokens is different for each token bucket 302.

During data storage device 106 operation, as the program/erase cycle (PEC) of the dies of the NVM 110 increases, the cell states may shift and widen, which may result in more frequent read threshold calibrations and require longer and more powerful decoding operations. In order to mitigate the effects of operating the data storage device 106 over time, the controller 108 may employ a wear leveling mechanism to ensure that each block of the NVM 110 has a similar PEC number. The wear leveling mechanism may be utilized in conjunction with endurance groups, where each NVM set of the one or more NVM sets 202, 212, 220 may be associated with an endurance group. For exemplary purposes, each of the NVM sets 202, 212, 220 may be referenced as an endurance group. For example, the first NVM set A 202 may be referred to as a first endurance group, the second NVM set B 212 may be referred to as a second endurance group, and the third NVM set C 220 may be referred to as a third endurance group.

The allocation of the one or more tokens 304 to the one or more endurance groups may be based on one or more factors in order to not exceed a bandwidth allotment. For example, the one or more factors may include a factor based on a power associated with an endurance group, a factor based on a number of decoding clocks associated with an endurance group, or a combination of the previously listed factors. It is to be understood that other factors not listed are contemplated and may be applicable to the embodiments described. The bandwidth allotment may be based on a size of an endurance group, a data type of the endurance group, an overall usage of the endurance group, or a combination of the previously listed elements.

During data storage device 106 operation, each endurance group may utilize any tokens 304 accumulated in the token bucket 302 to "pay" for an operation. It is contemplated that an endurance group may pay more than a minimum number of tokens to pay for an operation, such that the payment may reflect a urgency or a prioritization of the operation request. Furthermore, the controller 108 may determine different payment amounts for different operations based on system characteristics, such as QoS, latency, bandwidth, and resource availability. Furthermore, the one or more tokens 304 may provisioned by the controller 108, such that each endurance group may accumulate the one or more tokens 304 at a predetermined rate up to a saturation value (e.g., maximum token capacity of the token bucket 302), where the predetermined rate may be the same or different for each endurance group. Because the number of the one or more tokens 304 may be finite or limited per endurance group, each endurance group may request operations based on different needs due to the payment of the one or more tokens 304.

Figure 4:
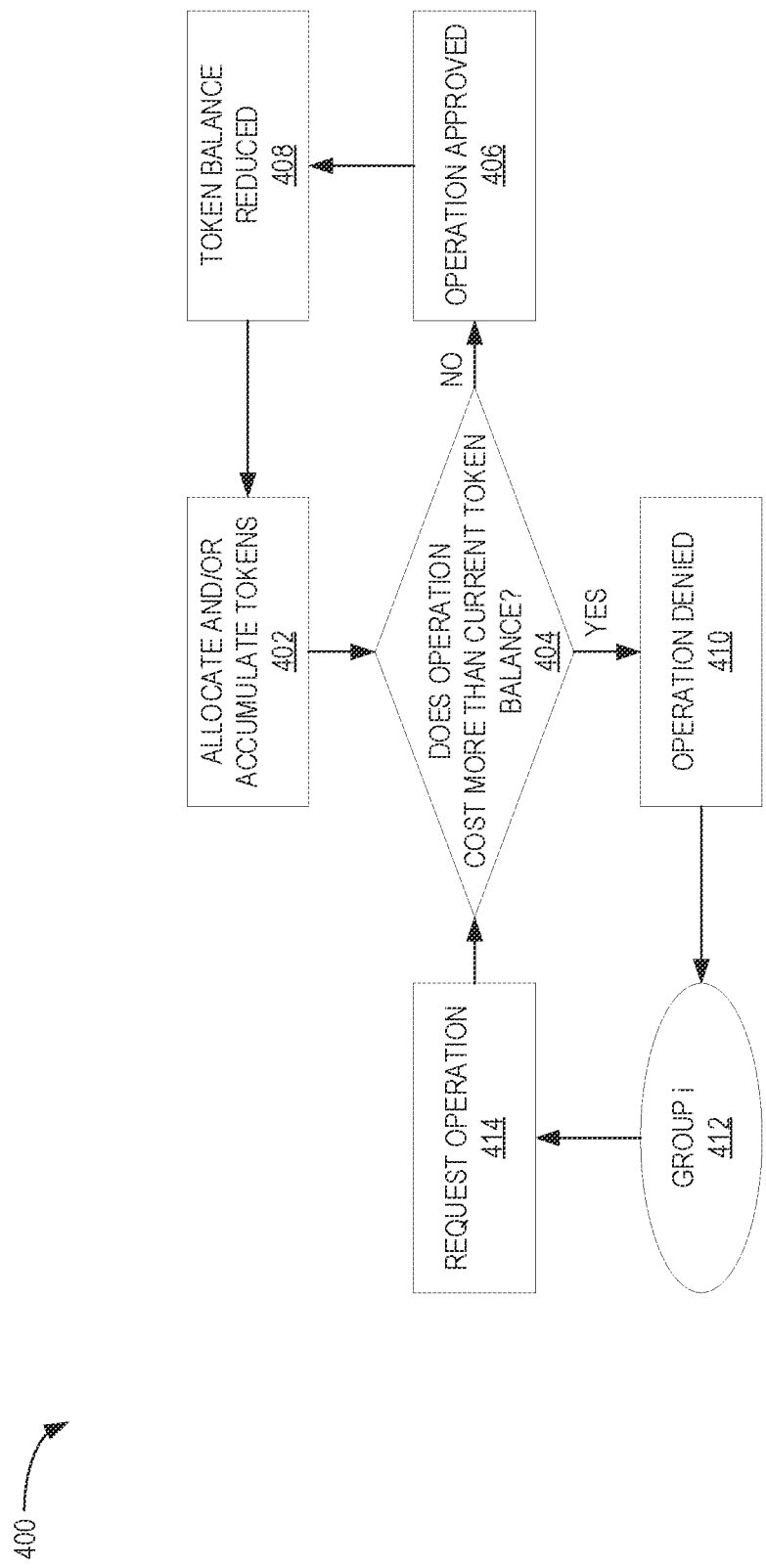
FIG. 4 is a flow diagram illustrating a method of approving and denying operations, according to certain embodiments.

FIG. 4 is a flow diagram illustrating a method 400 of approving and denying operations, according to certain embodiments. Method 400 may be employed by a controller, such as the controller 108 of FIG. 1. Furthermore references to a token may be the one or more tokens 304 of FIG. 3 and references to a token bucket may be the token bucket 302 of FIG. 3.

At block 402, the controller 108 allocates and/or provisions the one or more tokens 304 to the token bucket 302 of an endurance group, such as the first NVM set A 202. The token bucket 302 is provisioned the one or more tokens 304 at a predetermined rate, such that the first NVM set A 202 accumulates the one or more tokens 304 at the predetermined rate. Furthermore, it is to be understood that other endurance groups may accumulate the one or more tokens 304 at the same time that the first NVM set A 202 accumulates the one or more tokens 304. The predetermined accumulation rate for each endurance group may be the same and/or different. Furthermore, the allocated number of the one or more tokens 304 to each endurance group may be the same and/or different.

At block 404, the controller 108 determines if the operation requested by an endurance group costs more than the current token balance of the endurance group. The operations may be background maintenance operations in order to ensure that the data storage device 106 operates efficiently and optimally. The operations requested may include garbage collection, data relocations, wear leveling, read scrubs, and the like. If the cost is not greater than the current token balance at block 404, then the operation is approved by the controller 108 at block 406. At block 408, the token balance for the endurance group associated with the approved operation is reduced. Method 400 returns to block 402 after reducing the token balance at block 408.

However, if the endurance group does not have enough tokens to pay for the requested operation at block 404, such that the operation costs more than the current token balance of the endurance group, then the controller 108 denies the operation request at block 410. At block 412, the controller 108 adds the endurance group associated with the denied operation request to a group i, which may be a separate group that the controller 108 utilizes to keep track of endurance groups with denied operation requests. At block 414, the endurance group from group i requests the operation again. At block 404, the controller 108 determines if the endurance group has a token balance greater than or equal to the operation cost. If the endurance group does have a token balance greater than or equal to the operation cost at block 404, then method 400 advances to block 406. However, if the endurance group does not have a token balance greater than or equal to the operation cost at block 404, the method 400 advances to block 410.

Figure 5:
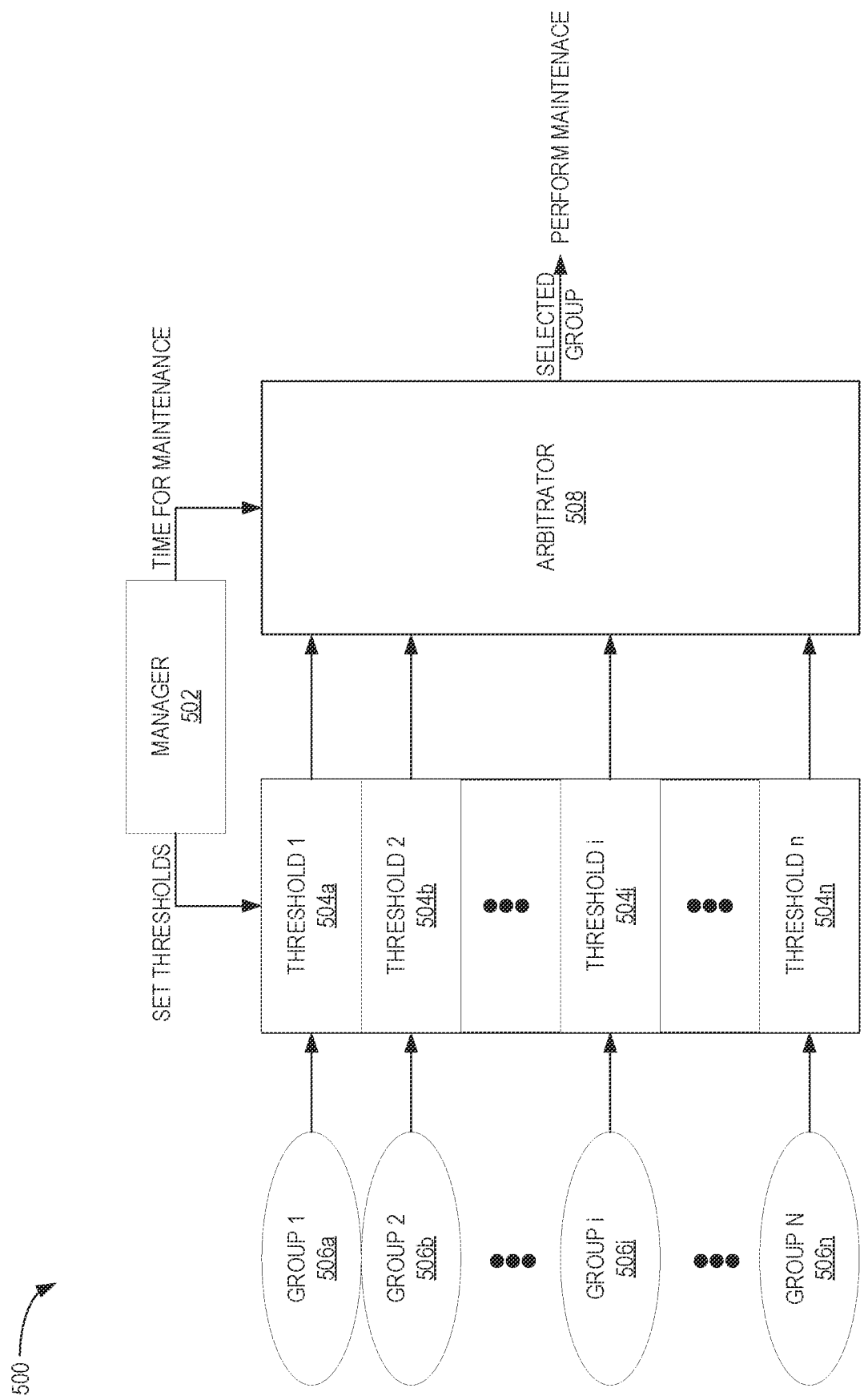
FIG. 5 is an illustration of a threshold adjustment management of maintenance operations, according to certain embodiments.

FIG. 5 is an illustration of a threshold adjustment management of maintenance operations, according to certain embodiments. A threshold manager unit 502 sets a plurality of thresholds 504a-504n, each associated with an endurance group of a plurality of endurance groups, group 1-group n 506a-506n, where each threshold may be individually set and adjusted per endurance group. For example, group 1 506a is associated with threshold 1 504a and group 2 506b is associated with threshold 504b. The threshold manager unit 502 may be a component of controller, such as the controller 108 of FIG. 1. The thresholds may be based on a percent of invalid data, number of blocks with high BER, and a combination of the previously listed factors. It is to be understood that other factors for the threshold are contemplated and may be applicable to the embodiments described.

The plurality of thresholds 504a-504n may be adjusted both ways (e.g., increased or decreased). For example, by raising a threshold, the respective endurance group may have less maintenance operations completed. Thus, the respective endurance group may be in a degraded state compared to other groups that have had more maintenance operations completed. For example, by lowering the amount of garbage collection operations an endurance group is allowed to complete, the amount of fragmented data and sustain read may be larger than other endurance groups. However, the burden on the system, such as the data storage device 106 of FIG. 1, may be lowered. In other cases, lowering the thresholds may allow an endurance group to get more system resources for a short period of time, but may ensure that the endurance group does overuse the system resources at a later time. For example, a cycled endurance group may receive more relocations to ensure it does not load a decoder with high bit error rate (BER) data.

Once an endurance group, such as group 1 506a, reaches the respective threshold for the group, such as threshold 1 504a, an arbitrator unit 508 receives an indication that the endurance group is at the threshold. The threshold manager unit 502 may determine a time for maintenance using the arbitrator unit 508. For example, the arbitrator unit 508 is aware of background operations and may trigger a maintenance operation for an endurance group based on availability of bandwidth. The arbitrator unit 508 may determine an order of the maintenance commands to execute based on available bandwidth and/or impact on system QoS. After determining the endurance group to perform its requested maintenance operation, the arbitrator unit 508 sends the request to the controller 108 to perform the maintenance. It is to be understood that once an endurance group hits a threshold, the endurance group pays a respective amount of tokens to be able to perform the operation.

It is to be understood that the allocated amount of tokens may be based on a determined maintenance time for an endurance group, a size of the endurance group, a usage statistic of the endurance group, a failed bit count of the endurance group, a PEC count of the endurance group, an amount of used space of the endurance group, a system state (e.g., beginning of life versus end of life), and/or a BER of the endurance group. It is to be further understood that the allocated amount of tokens may be based on, in addition to the previously listed factors or independently of the previously listed factors, a determined maintenance time for other endurance groups, a size of the other endurance groups, a usage statistic of the other endurance groups, a failed bit count of the other endurance groups, a PEC count of the other endurance groups, an amount of used space of the other endurance groups, and/or a BER of the other endurance groups.

Figure 6:
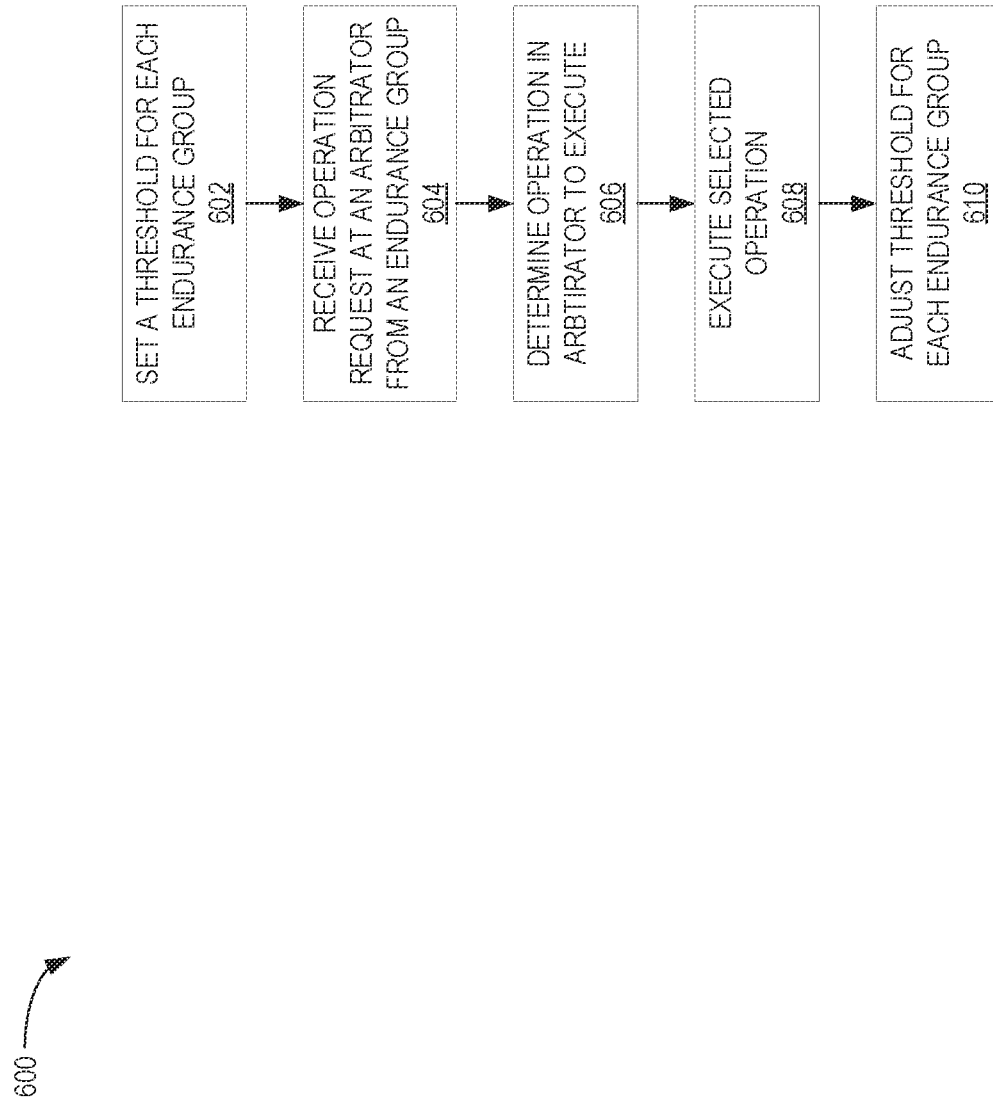
FIG. 6 is a flow diagram illustrating a method of selecting an operation to execute, according to certain embodiments.

FIG. 6 is a flow diagram illustrating a method 600 of selecting an operation to execute, according to certain embodiments. Method 600 may be employed by an arbitrator, such as the arbitrator unit 508 of FIG. 5, of a controller, such as the controller 108 of FIG. 1. Furthermore references to a token may be the one or more tokens 304 of FIG. 3 and references to a token bucket may be the token bucket 302 of FIG. 3.

At block 602, a threshold manager unit, such as the threshold manager unit 502 of FIG. 5, of the controller 108 sets a threshold for each of the endurance groups. The threshold may be independently set, such that each threshold is the same or different from another threshold. At block 604, the arbitrator unit 508 receives an operation request from an endurance group due to the endurance group reaching or exceeding a threshold for the endurance group. At block 606, the arbitrator unit 508 determines which requested maintenance operation or operations to execute. At block 610, the selected maintenance operation is executed. At block 610, the threshold manager unit 502 adjusts a threshold for one or more endurance groups based on the endurance group statistics and available bandwidth.

Figure 7:
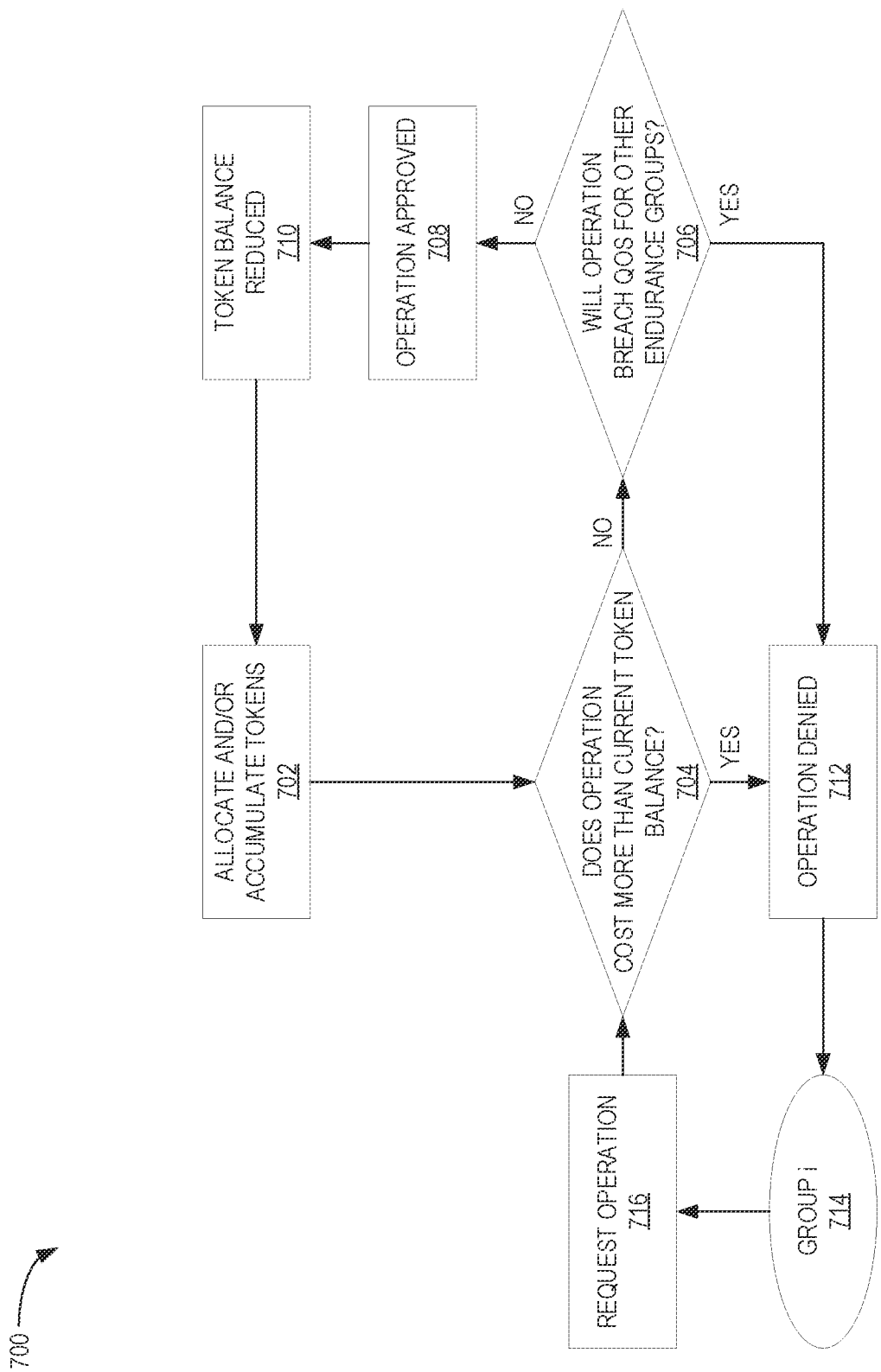
FIG. 7 is a flow diagram illustrating a method of approving and denying operations with respect to QoS, according to certain embodiments.

FIG. 7 is a flow diagram illustrating a method 700 of approving and denying operations with respect to QoS, according to certain embodiments. Method 700 may be employed by a controller, such as the controller 108 of FIG. 1. Furthermore references to a token may be the one or more tokens 304 of FIG. 3 and references to a token bucket may be the token bucket 302 of FIG. 3.

At block 702, the controller 108 allocates and/or provisions the one or more tokens 304 to the token bucket 302 of an endurance group, such as the first NVM set A 202. The token bucket 302 is provisioned the one or more tokens 304 at a predetermined rate, such that the first NVM set A 202 accumulates the one or more tokens 304 at the predetermined rate. Furthermore, it is to be understood that other endurance groups may accumulate the one or more tokens 304 at the same time that the first NVM set A 202 accumulates the one or more tokens 304. The predetermined accumulation rate for each endurance group may be the same and/or different. Furthermore, the allocated number of the one or more tokens 304 to each endurance group may be the same and/or different.

At block 704, the controller 108 determines if the operation requested by an endurance group costs more than the current token balance of the endurance group. The operations may be background maintenance operations in order to ensure that the data storage device 106 operates efficiently and optimally. The operations requested may include garbage collection, data relocations, wear leveling, read scrubs, and the like. If the cost is not greater than the current token balance at block 704, then the controller 108 determines if the operation break a QoS metric for other endurance group at block 706. For example, if the controller 108 determines that approving and executing a maintenance command for an endurance will cause the other endurance groups to suffer in latency or bandwidth, the controller 108 may decide to skip or postpone executing the maintenance command.

Because system performance is impacted by central processing unit (CPU) time, RAM allocation bus availability, and ECC encoder/decoder availability, the use of the previously listed resources may cause a bottleneck or a non-optimized system operation. For example, when a decoder is required by the maintenance operation, the relevant ECC engines must be freed from its current workload in order to emulate the best read threshold. Therefore, tokening methods (e.g., cost of performing the maintenance operation) is completed globally so that the ECC usage is tracked properly. If the controller 108 determines that the QoS of other endurance groups are not impacted by the executing of the endurance command at block 706, then the maintenance operation is approved at block 708. At block 710, the token balance for the endurance group associated with the approved operation is reduced. Method 700 returns to block 702 after reducing the token balance by the maintenance operation cost at block 710.

However, if the endurance group does not have enough tokens to pay for the requested operation at block 704, such that the operation costs more than the current token balance of the endurance group, or if executing the maintenance operation will breach a QoS metric for the other endurance groups at block 706, then the controller 108 denies the operation request at block 712. At block 714, the controller 108 adds the endurance group associated with the denied operation request to a group i, which may be a separate group that the controller 108 utilizes to keep track of endurance groups with denied operation requests. At block 716, the endurance group from group i requests the operation again. At block 704, the controller 108 determines if the endurance group has a token balance greater than or equal to the operation cost. If the endurance group does have a token balance greater than or equal to the operation cost at block 704, then method 700 advances to block 706. However, if the endurance group does not have a token balance greater than or equal to the operation cost at block 704, the method 700 advances to block 712.

By managing common/shared resources and maintain fairness between the endurance groups, the overall performance of the data storage device may be improved.

In one embodiment, a data storage device includes a memory device including a plurality of endurance groups and a controller coupled to the memory device. The controller is configured to allocate tokens to the plurality of endurance groups, determine whether an endurance group has sufficient tokens to perform an operation, wherein the operation is selected from the group consisting of: garbage collection, relocation of data, and read scrubbing, and either deny the operation or approve the operation.

The controller is further configured to determine a minimum amount of tokens to perform the operation. Each endurance group of the plurality of endurance groups accumulates tokens at a predetermined rate. The predetermined rate is different for each endurance group of the plurality of endurance groups. Each endurance group of the plurality of endurance groups has a maximum token amount. A sum of the allocated tokens and the accumulated tokens for an endurance group does not exceed the maximum token amount. Approving the operation reduces a token balance of the endurance group. Each operation of the group has a different token cost to perform the operation. A first endurance group includes a first bucket for the tokens and a second endurance group includes a second bucket for the tokens. The first bucket has a size different from the second bucket.

In another embodiment, a data storage device includes a memory device including a plurality of endurance groups and a controller coupled to the memory device. The controller is configured to set thresholds for each endurance group of the plurality of endurance groups and adjust a threshold for one or more endurance groups of the plurality of endurance groups.

The controller comprises a threshold manager unit. The controller further comprises an arbitrator unit. The adjusting includes raising a threshold of the one or more endurance groups of the plurality of endurance groups. The adjusting includes decreasing a threshold of the one or more endurance groups of the plurality of endurance groups. The controller is further configured to allocate an amount of tokens to each endurance group of the plurality of endurance groups, wherein the allocation is based on at least one of a determined maintenance time for an endurance group and/or other endurance groups, a size of the endurance group and/or the other endurance groups, a usage statistic of the endurance group and/or the other endurance groups, a failed bit count of the endurance group and/or the other endurance groups, a bit error rate (BER) of the endurance group and/or the other endurance groups, a program/erase cycle (PEC) count of the endurance group and/or the other endurance groups, an amount of used space of the endurance group and/or the other endurance groups, and a system state of the data storage device. Each endurance group of the plurality of endurance groups has a different threshold.

In another embodiment, a data storage device includes a memory means having a plurality of endurance groups and a controller coupled to the memory means. The controller is configured to determine that an endurance group has sufficient tokens to perform an operation of a plurality of operations, determine whether the operation will breach quality of service for other endurance groups, and either approve or deny the operation.

The controller comprises an arbitrator unit. The arbitrator unit is configured to determine an order of execution of approved operations. The order of execution includes ordering by central processing unit (CPU) time, random access memory (RAM) allocation bus availability, and error correction code (ECC) encoder/decoder usage. Each endurance group of the plurality of endurance groups includes an allocated number of tokens, a predetermined token accumulation rate, and a maximum token bucket size for storing tokens. Each operation of the plurality of operations costs a different amount of tokens. The controller is further configured to calculate a latency impact on the other endurance groups upon approval of the operation.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
  a memory device comprising a plurality of endurance groups; and
  a controller coupled to the memory device, wherein the controller is configured to:
    allocate tokens to the plurality of endurance groups;
    determine whether an endurance group has sufficient tokens to perform an operation, wherein the operation is selected from the group consisting of: garbage collection, relocation of data, and read scrubbing; and approve the operation when the endurance group has sufficient tokens to perform the operation, wherein approving the operation further comprises calculating a latency impact on the other endurance groups.

2. The data storage device of claim 1, wherein the controller is further configured to determine a minimum amount of tokens to perform the operation.

3. The data storage device of claim 1, wherein each endurance group of the plurality of endurance groups accumulates tokens at a predetermined rate.

4. The data storage device of claim 3, wherein the predetermined rate is different for each endurance group of the plurality of endurance groups.

5. The data storage device of claim 3, wherein each endurance group of the plurality of endurance groups has a maximum token amount, and wherein a sum of the allocated tokens and the accumulated tokens for an endurance group does not exceed the maximum token amount.

6. The data storage device of claim 1, wherein approving the operation reduces a token balance of the endurance group.

7. The data storage device of claim 1, wherein each operation of the group has a different token cost to perform the operation.

8. The data storage device of claim 1, wherein a first endurance group includes a first bucket for the tokens and a second endurance group includes a second bucket for the tokens, and wherein the first bucket has a size different from the second bucket.

9. A data storage device, comprising:
a memory device having a plurality of endurance groups;
a controller coupled to the memory device, wherein the controller is configured to:
set thresholds for each endurance group of the plurality of endurance groups;
adjust a threshold for one or more endurance groups of the plurality of endurance groups;
determine that the threshold for an endurance group of the one or more endurance groups of the plurality of endurance groups has been reached;
determine whether the endurance group has sufficient tokens to perform an operation, wherein the operation is selected from the group consisting of: garbage collection, relocation of data, and read scrubbing; and
approve the operation when the endurance group has sufficient tokens to perform the operation, wherein approving the operation further comprises calculating a latency impact on each endurance group of the plurality of endurance groups.

10. The data storage device of claim 9, wherein the controller comprises a threshold manager unit.

11. The data storage device of claim 10, wherein the controller further comprises an arbitrator unit.

12. The data storage device of claim 9, wherein the adjusting comprises raising a threshold of the one or more endurance groups of the plurality of endurance groups.

13. The data storage device of claim 9, wherein the adjusting comprises decreasing a threshold of the one or more endurance groups of the plurality of endurance groups.

14. The data storage device of claim 9, wherein the controller is further configured to allocate an amount of tokens to each endurance group of the plurality of endurance groups, wherein the allocation is based on at least one of:
a determined maintenance time for an endurance group and/or other endurance groups;
a size of the endurance group and/or the other endurance groups;
a usage statistic of the endurance group and/or the other endurance groups;
a failed bit count of the endurance group and/or the other endurance groups;
a bit error rate (BER) of the endurance group and/or the other endurance groups;
a program/erase cycle (PEC) count of the endurance group and/or the other endurance groups;
an amount of used space of the endurance group and/or the other endurance groups; and
a system state of the data storage device.

15. The data storage device of claim 9, wherein each endurance group of the plurality of endurance groups has a different threshold.

16. A data storage device, comprising:
memory means having a plurality of endurance groups; and
a controller coupled to the memory means, wherein the controller is configured to:
determine that an endurance group has sufficient tokens to perform an operation of a plurality of operations;
determine whether the operation will breach quality of service for other endurance groups;
either approve or deny the operation; and
calculate a latency impact on the other endurance groups upon approval of the operation.

17. The data storage device of claim 16, wherein the controller comprises an arbitrator unit, and wherein the arbitrator unit is configured to determine an order of execution of approved operations.

18. The data storage device of claim 17, wherein the order of execution includes ordering by central processing unit (CPU) time, random access memory (RAM) allocation bus availability, and error correction code (ECC) encoder/decoder usage.

19. The data storage device of claim 16, wherein:
each endurance group of the plurality of endurance groups comprises:
an allocated number of tokens;
a predetermined token accumulation rate; and
a maximum token bucket size for storing tokens; and
each operation of the plurality of operations costs a different amount of tokens.

* * * * *